(No Model.)
W. DEARDEN.
FILTER.
No. 316,124. Patented Apr. 21, 1885.
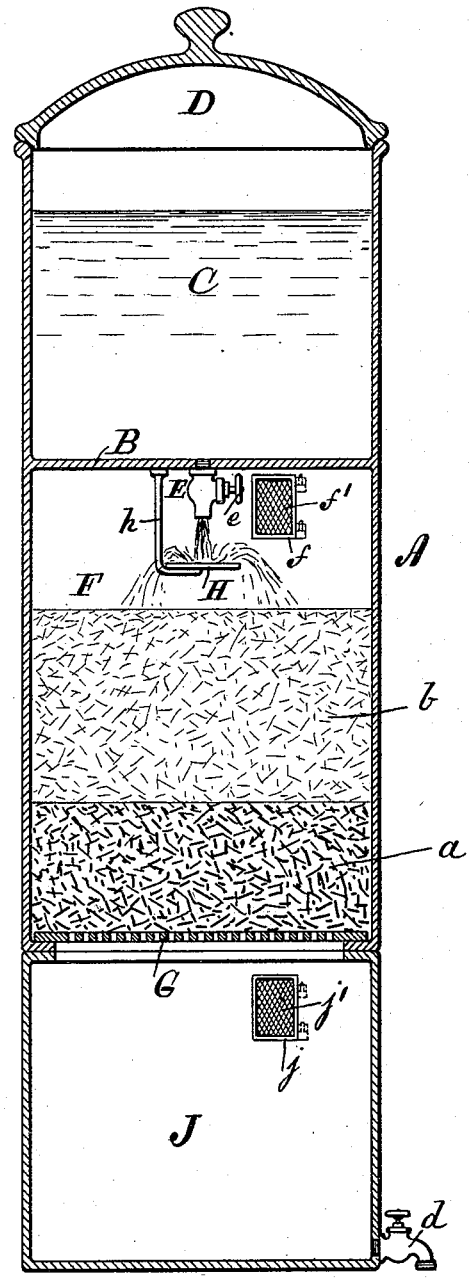
WITNESSES:
J. Cook.
C. Sedgwick
INVENTOR:
W. Dearden
BY Munn & Co
ATTORNEYS.

ated April 21, 1885.

UNITED STATES PATENT OFFICE.

WALTER DEARDEN, OF TRINIDAD, COLORADO.

FILTER.

SPECIFICATION forming part of Letters Patent No. 316,124, dated April 21, 1885.

Application filed January 24, 1885. (No model.)

*To all whom it may concern:*

Be it known that I, WALTER DEARDEN, of Trinidad, in the county of Las Animas and State of Colorado, have invented a new and Improved Filter, of which the following is a full, clear, and exact description.

This invention relates to a filter designed more especially for domestic use; and the invention consists of the special construction, arrangement, and combination of the parts of the filter, all as hereinafter described and claimed.

Reference is to be had to the accompanying drawing, forming a part of this specification, in which the figure is a sectional elevation of my new and improved filter.

The body A of the filter may be of wood, galvanized iron, earthenware, or any other suitable material, and may be of any appropriate size. At the top of the filter is formed, by the horizontal partition B, the receptacle C, to receive the water to be filtered. This receptacle C is closed by the cover D. In the partition B is fitted the cock E, the stem e of which may be turned to regulate the flow of water from the receptacle or compartment C to the compartment F below. In the compartment F is placed, upon the perforated bottom G, the body of gravel a, and upon the gravel is placed the body of sharp, coarse sand b. Under the cock E is placed the distributing-plate H, upon which the stream of water from the cock E strikes, and is thus divided and distributed over the upper surface of the body of sand b. The plate H in this instance is held by the arm h, depending from the partition B. Below the perforated bottom G is the lower compartment, J, that receives the filtered water, which may be drawn out of the filter through the faucet d. Just below the partition B, I form in the body A an opening, f, closed by a wire door, f', that permits free access of air to the compartment F, and by opening the door permits the stem e of the cock E to be turned to regulate the flow of water through the cock. In the compartment J, just below the perforated bottom G, I form another opening, j, also closed by a wire door, j', that permits free access of air to the filter below the filtering material, so that the water is plentifully aerated in the filter, and this free access of air is of special importance in the compartment F, as the water, being divided into spray by the plate H, will be brought into intimate contact with the air, and the air will mingle with the sand, causing the water to be minutely divided in the sand, so that it will spread in thin films over each grain of sand, and thus become thoroughly exposed to its purifying effect. The water should never be permitted to enter the compartment F in quantities to cover the sand.

This filter is to a certain extent self-cleansing. In case of very dirty water being used the top layer of sand may need to be scraped off now and then, but with ordinary water, the rule being always strictly observed of never running the water on fast enough to cover the surface of the sand, which would prevent the air from entering the body of the filter with the water, the iron in solution is oxidized to insoluble peroxide and left in the filter and organic matter in solution is oxidized to harmless matter.

To increase the quantity of filtered water, the area must be increased, the thickness of bed remaining about the same.

In a filter of ordinary size—say fourteen inches in diameter—the body of sand will be about six inches in depth and the pebbles about four inches in depth.

Having thus described my invention, what I claim as new, and desire to secure by Letters Patent, is—

The filter herein shown and described, having upper and lower water-compartments, C J, and intermediate filter-compartment, F, and partition B, provided with the cock E, held over a distributing-plate, H, the compartments F J being formed with the air-openings f j, substantially as and for the purposes set forth.

WALTER DEARDEN.

Witnesses:
JOHN ROOSA,
FLORENCE M. DEARDEN.